(12) United States Patent
Ishino

(10) Patent No.: US 9,897,467 B2
(45) Date of Patent: Feb. 20, 2018

(54) ROTATION NUMBER DETECTOR

(71) Applicant: DENSO CORPORATION, Kariya, Aichi-pref. (JP)

(72) Inventor: Hirotsugu Ishino, Kariya (JP)

(73) Assignee: DENSO CORPORATION, Kariya (JP)

(*) Notice: Subject to any disclaimer, the term of this patent is extended or adjusted under 35 U.S.C. 154(b) by 108 days.

(21) Appl. No.: 14/926,468

(22) Filed: Oct. 29, 2015

(65) Prior Publication Data
US 2016/0123777 A1    May 5, 2016

(30) Foreign Application Priority Data
Nov. 5, 2014  (JP) ................................ 2014-225111

(51) Int. Cl.
*G11B 19/247* (2006.01)
*G01D 5/20* (2006.01)

(52) U.S. Cl.
CPC .................. *G01D 5/2006* (2013.01)

(58) Field of Classification Search
CPC ...... B60W 10/06; B60W 10/08; B60W 20/00; B60W 10/02; B60W 20/40; B60W 20/50; B60W 2710/0644; B60W 10/10; B60K 6/445; Y02T 10/6239; Y02T 10/6286
See application file for complete search history.

(56) References Cited

U.S. PATENT DOCUMENTS

| 4,016,723 | A | * | 4/1977 | Farley | ..................... | E21B 41/06 |
| | | | | | | 324/166 |
| 5,744,950 | A | * | 4/1998 | Seefeldt | .................. | G01P 3/489 |
| | | | | | | 324/166 |
| 7,355,828 | B2 | * | 4/2008 | Jones | ....................... | G05B 9/03 |
| | | | | | | 290/40 A |

FOREIGN PATENT DOCUMENTS

JP    2013-224847    10/2013

* cited by examiner

*Primary Examiner* — Alesa Allgood
(74) *Attorney, Agent, or Firm* — Nixon & Vanderhye P.C.

(57) ABSTRACT

A rotation number detector outputs a signal based on a detection signal from a sensor, the detection signal reflecting a movement of a detected portion of a detection object. The output signal from the sensor is rectified by a comparator. A cycle measurement circuit measures a cycle of a rectangular wave signal from the comparator. A variable divider variably divides the cycle in reverse proportion to the measured cycle of the cycle measurement circuit, dividing the cycle by a smaller dividing ratio when the measured cycle becomes longer and dividing the cycle by a greater dividing ratio when the measured cycle becomes shorter. A one shot circuit converts the rectangular wave signal of the variable divider to a signal having a dividing ratio discernible wave form, which represents the dividing ratio of the variable divider, and outputs such a signal.

8 Claims, 13 Drawing Sheets

| ITEM | CYCLE DIVISION FACTOR | | | | |
|---|---|---|---|---|---|
| | 16 | 8 | 4 | 2 | 1 |
| LO TIME (ms) | 1.6 | 0.8 | 0.4 | 0.2 | 0.1 |

FIG. 5

|  |  | CYCLE DIVISION FACTOR | | | | |
|---|---|---|---|---|---|---|
| ROTATION NUMBER (rpm) | MEASURED CYCLE (ms) | 16 | 8 | 4 | 2 | 1 |
| 300 THS (THOUSAND) | 0.2 | 3.2 | 1.6 | 0.8 | 0.4 | 0.2 |
| 150 THS | 0.4 | 6.4 | 3.2 | 1.6 | 0.8 | 0.4 |
| 75 THS | 0.8 | 12.8 | 6.4 | 3.2 | 1.6 | 0.8 |
| 37.5 THS | 1.6 | 25.6 | 12.8 | 6.4 | 3.2 | 1.6 |
| 18.75 THS | 3.2 | 51.2 | 25.6 | 12.8 | 6.4 | 3.2 |
| 9.375 THS | 6.4 | 102.4 | 51.2 | 25.6 | 12.8 | 6.4 |

FIG. 6

| ITEM | CYCLE DIVISION FACTOR | | | | |
|---|---|---|---|---|---|
|  | 16 | 8 | 4 | 2 | 1 |
| DUTY | 20% | 30% | 40% | 50% | 60% |

| ROTATION NUMBER (rpm) | MEASURED CYCLE (ms) | CYCLE DIVISION FACTOR | | | | |
|---|---|---|---|---|---|---|
| | | 16 | 8 | 4 | 2 | 1 |
| 300 THS (THOUSAND) | 0.2 | 3.2 | 1.6 | 0.8 | 0.4 | 0.2 |
| 150 THS | 0.4 | 6.4 | 3.2 | 1.6 | 0.8 | 0.4 |
| 75 THS | 0.8 | 12.8 | 6.4 | 3.2 | 1.6 | 0.8 |
| 37.5 THS | 1.6 | 25.6 | 12.8 | 6.4 | 3.2 | 1.6 |
| 18.75 THS | 3.2 | 51.2 | 25.6 | 12.8 | 6.4 | 3.2 |
| 9.375 THS | 6.4 | 102.4 | 51.2 | 25.6 | 12.8 | 6.4 |

ROTATION NUMBER DETECTOR

CROSS REFERENCE TO RELATED APPLICATION

The present application is based on and claims the benefit of priority of Japanese Patent Application No. 2014-225111, filed on Nov. 5, 2014, the disclosure of which is incorporated herein by reference.

TECHNICAL FIELD

The present disclosure generally relates to a rotation number detector which outputs a signal according to the number of rotations of a detection object.

BACKGROUND INFORMATION

The rotation number detector that outputs a signal according to the number of rotations of the rotation shaft of a turbo charger detects a movement of the blade provided on the rotation shaft of the turbo charger. For example, the rotation number detector disclosed in a patent document, Japanese Patent Laid-Open No. 2013-224847 A (patent document 1) detects the number of rotations of the rotation shaft, a vibration of the rotation shaft, and the clearance between the blade and a sensor by processing a signal outputted from the sensor disposed in a non-contact manner relative to the blade. Among these detection items, the number of rotations of the rotation shaft is detected (i) by dividing the output signal of the sensor with a dividing ratio, which is the same number as the number of the blades of the turbo charger, and (ii) by detecting a cycle of the divided signal.

However, the dividing ratio of the rotation number detector in the patent document 1 for dividing the output signal from the sensor is fixed. Therefore, when the number of rotations of the rotation shaft of the turbo charger changes in a wide range (e.g., from 10,000 rotations to 300,000 rotations), a detection time to detect the length of the cycle of the divided signal also changes in a wide range (i.e., 30 times in the above example). On the other hand, the control cycle time for controlling the electronic control unit that receives the signal outputted from the rotation number detector is usually configured on an order of milliseconds. Therefore, in case that the output signal of the rotation number detector having a short cycle is adapted to the control cycle time of the electronic control unit, the output signal from the rotation number detector at a time when the turbo charger is rotating at a very low rotation number may be updated too slowly in terms of the update cycle of the electronic control unit, thereby making it difficult to be adapted to the control cycle time of the electronic control unit.

Further, in case that the long cycle output signal is divided by a very high dividing ratio to have a divided cycle on an order of milliseconds, the shorter cycle output signal at a time of a very high speed rotation of the rotation shaft of the turbo charger may become too short for an accurate cycle measurement, if the dividing ratio is fixed to a certain number. That is, the detection accuracy of the cycle measurement may be deteriorated in such detection scheme.

SUMMARY

It is an object of the present disclosure to provide a rotation number detector that is capable of sending a signal regarding the number of rotations of a detection object within a control cycle time of the electronic control unit even when the number of rotations of the detection object varies in a wide range.

In an aspect of the present disclosure, a rotation number detector that detects a number of rotations of a detection object, including a sensor, a comparator, a cycle measurement circuit, a variable divider, and a one shot circuit. The sensor outputs a signal according to a movement of a detected portion of the detection object. The comparator outputs a rectangular wave signal that is derived from the output signal of the sensor by a binary processing based on a preset threshold. The cycle measurement circuit measures a cycle of the rectangular wave signal that is output from the comparator. The variable divider variably divides the cycle of the rectangular wave signal that is measured by the cycle measurement circuit and outputs the divided cycle of the rectangular wave signal. A dividing ratio of the divided cycle of the rectangular wave signal is decreased in reverse proportion to a length of the measured cycle of the rectangular wave signal that is measured by the cycle measurement circuit, or the dividing ratio of the divided cycle of the rectangular wave signal is equated to one f when the length of the measured cycle of the rectangular wave signal becomes longer, or the dividing ratio of the rectangular wave signal is increased in reverse proportion of the length of the measured cycle of the rectangular wave signal when the length of the measured cycle of the rectangular wave signal becomes shorter. The one shot circuit converts the divided cycle of the rectangular wave signal output from the variable divider to a conversion signal having (i) a dividing ratio discernible wave form indicative of the dividing ratio used in the division by the variable divider and (ii) a same cycle as the divided cycle of the rectangular wave signal output from the variable divider.

In such manner, regardless of the length of the cycle of the output signal of the sensor, the length of the cycle of the output signal from the one shot circuit is controlled to be within a preset time length. Therefore, the rotation number detector can control the cycle of the output signal to be within a control cycle time of the recipient (i.e., the electronic control unit receiving the output signal of the rotation number detector). Thus, even when the high-low difference of the number of rotations of the detection object is large, the rotation number detector can send out the signal within the control cycle time of the electronic control unit without increasing the load of the electronic control unit, thereby enabling an update of the data of the number of rotation in the electronic control unit within the control cycle time.

Further, the dividing ratio discernible wave form of the output signal from the one shot circuit enables that what dividing ratio the variable divider has used to divide the cycle of the signal. Therefore, the recipient of the signal, (i.e., the electronic control unit, can discern the dividing ratio used by the variable divider based on the wave form of the signal. Thus, the electronic control unit can detect the number of rotations of the detection object based on (i) the cycle of the output signal from the rotation number detector and (ii) the dividing ratio discerned from the wave form of the output signal from the rotation number detector.

In another aspect of the present disclosure, the rotation number detector includes a sensor, a comparator, a variable divider, a cycle measurement circuit, and a communication circuit. The sensor outputs a signal according to a movement of a detected portion of a detection object. The comparator outputs a rectangular wave signal that is derived from the output signal of the sensor by a binary processing based on a preset threshold. The variable divider variably divides a cycle of the rectangular wave signal that is output from the comparator and outputs a divided cycle of the rectangular wave signal. A dividing ratio of the divided cycle of the rectangular wave signal is decreased in reverse proportion to a cycle length of the output rectangular wave signal of the comparator, so the dividing ratio of the divided cycle of the rectangular wave signal is equated to one when the cycle length of the output rectangular wave signal of the comparator becomes longer, or the dividing ratio of the rectangular wave signal is increased in reverse proportion to the cycle length of the output rectangular wave signal of the comparator when the cycle length of the output rectangular wave signal of the comparator becomes shorter. The cycle measurement circuit measures the divided cycle of the rectangular wave signal that is output from the variable divider and outputs a calculation data that is a multiplication of a cycle count value and a number that is in proportion to the dividing ratio of the divided cycle of the rectangular wave signal of the variable divider. The communication circuit stores the output calculation data of the cycle measurement circuit, and reads and outputs the stored output calculation data at predetermined intervals.

In such manner, even when the cycle of the rectangular wave signal outputted from the comparator is long, the variable divider divides the cycle of the rectangular wave signal with a small dividing ratio, thereby preventing the cycle measurement time by the cycle measurement circuit from exceeding the cycle of the output signal from the comparator. Therefore, the rotation number detector can quickly update the data that is outputted from the communication circuit.

Further, when the cycle of the rectangular wave signal outputted from the comparator is short, the variable divider divides the rectangular wave signal by a large dividing ratio, thereby enabling the cycle measurement circuit to have a high measurement accuracy in the measurement of the cycle of the signal. Therefore, the rotation number detector can improve the accuracy of the data outputted from the communication circuit.

In yet another aspect of the present disclosure, the electronic control unit that receives a communication data signal that is output from the communication circuit of the rotation number detector is disclosed. The electronic control unit includes a header time measurement section, a header time comparator, and a cycle data corrector. The header time measurement section detects a header time of the communication data signal. The header time comparator compares the header time detected by the header time measurement section with a normal header time that is stored in the electronic control unit. The cycle data corrector corrects a cycle data of the communication data signal based on a time difference between the header time detected by the header time measurement section and the normal header time.

In such manner, even when a clock signal outputted by an oscillator circuit of the rotation number detector has an error, the electronic control unit can correct an error of the cycle which is caused by the error of the clock signal. Therefore, the electronic control unit can detect an accurate number of rotations based on the communication data signal outputted from the rotation number detector.

BRIEF DESCRIPTION OF THE DRAWINGS

Objects, features, and advantages of the present disclosure will become more apparent from the following detailed description made with reference to the accompanying drawings, in which:

FIG. 5 is a table of a relationship among a number of rotations of a detection object, a measurement cycle of a sensor signal, a dividing ratio, and a cycle of the output signal;

FIG. 6 is a table of a relationship between a duty ratio of the output signal and the dividing ratio selected by multiplexer in a second embodiment of present disclosure;

DETAILED DESCRIPTION

Figure 1:
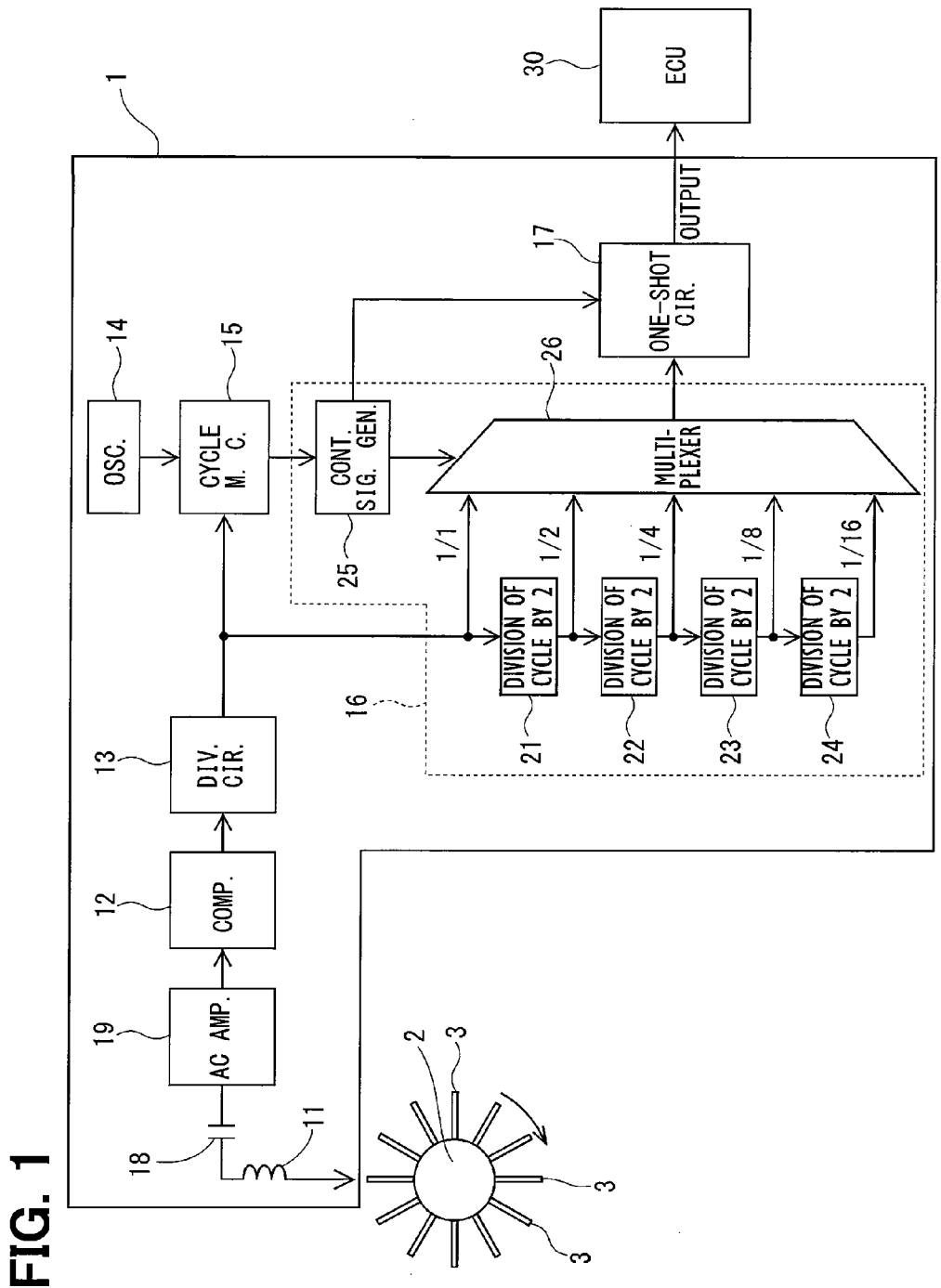
FIG. 1 is a schematic diagram of a rotation number detector in a first embodiment of present disclosure.

Hereafter, embodiments of the present disclosure are described based on the drawings. In each of the following embodiments, like numbers represent like parts, and the description of the like parts will not be repeated.

(First Embodiment)

The first embodiment of the present disclosure is shown in FIGS. 1-5. A rotation number detector 1 outputs a signal according to the number of rotations of a rotating body, which is a detection object, by detecting a movement of a detected portion of the rotating body.

The rotation number detector 1 of the first embodiment can be used for detection of the number of rotations of a rotation shaft 2 of a turbo charger, for example. In this case, the rotation number detector 1 outputs a signal according to the number of rotations of the rotation shaft 2 by detecting a movement of a blade 3 disposed on the rotation shaft 2 of the turbo charger.

According to the first embodiment, the rotation shaft 2 of the turbo charger corresponds to a "detection object", and the blade 3 on the rotation shaft 2 corresponds to a "detected portion."

First, the configuration of the rotation number detector 1 is described.

The rotation number detector 1 is provided with a sensor 11, a comparator 12, a divider circuit 13, an oscillator circuit 14, a cycle-measurement circuit 15, a variable divider 16, and a one-shot circuit 17 together with other components.

The sensor 11 is a coil, for example, and is positioned close to the blade 3 of the turbo charger (i.e., close to a detected portion, in a non-contact manner), and outputs an analog signal (e.g., an alternating current signal) according to the effect of the eddy current generated by a movement of the blade 3. The analog signal outputted from the sensor 11 is inputted to an Alternating Current (AC) amplifier 19 via a capacitor 18, and is amplified by the AC amplifier 19.

The signal outputted from the AC amplifier 19 is inputted to the comparator 12. The comparator 12 outputs a binarized rectangular wave signal by comparing the output signal of the AC amplifier 19 with a predetermined threshold value.

The rectangular wave signal outputted from the comparator 12 is inputted to the divider circuit 13. The divider circuit 13 performs a division of the rectangular wave signal outputted from the comparator 12 by a predetermined dividing ratio.

According to the present embodiment, the divider circuit 13 uses the number of the blades on the shaft 2 of the turbo charger as the dividing ratio for dividing the signal cycle. Thereby, the cycle time (i.e., the length of the cycle) of the rectangular wave signal outputted from the divider circuit 13 matches the time of one rotation of the rotation shaft 2 of the turbo charger. That is, when the divider circuit 13 sets the dividing ratio to the number of the detected portions (i.e., to the number of the blades) on the detection object (i.e., the rotation shaft 2), and performs the division of the cycle, one cycle of the rectangular wave signal outputted from the divider circuit 13 is equated to a time of one rotation of the rotating body.

In such case, the divider circuit 13 may set the dividing ratio to a different number (i.e., to a number other than the number of the detected portions on the detection object) for the division of the cycle. Alternatively, when the cycle of the signal of the sensor 11 is sufficiently long for performing the cycle measurement described later, the divider circuit 13 may be omitted and the cycle of the signal of the comparator 12 may directly be inputted to the cycle-measurement circuit 15.

The cycle-measurement circuit 15 measures the cycle of the rectangular wave (i.e., a pulse wave signal) outputted from the divider circuit 13. The cycle measurement by the cycle-measurement circuit 15 is performed by counting the clock signal outputted at the predetermined interval from the oscillator circuit 14 for a period between one rising edge and the subsequent rising edge of the pulse wave signal, or for a period between one falling edge and the subsequent falling edge of the pulse wave signal.

Further, the rectangular wave signal outputted from the divider circuit 13 is inputted to the variable divider 16. The variable divider 16 has a plurality of dividers 21-24, a control signal generating circuit 25, a multiplexer 26, together with other components.

The rectangular wave signal outputted from the divider circuit 13 is directly inputted to the multiplexer 26 as a signal of having a dividing ratio of one, and is also inputted to the multiplexer 26 after the division by the plurality of dividers 21-24.

The plurality of dividers 21-24 perform the division of the rectangular wave signal outputted from the comparator 12 in order. That is, the first divider 21 divides the rectangular wave signal outputted from the comparator 12 by a division factor of 2. The second divider 22 further divides the rectangular wave signal outputted from the first divider 21 by a division factor of 2. The third divider 23 further divides the rectangular wave signal outputted from the second divider 22 by a division factor of 2. The fourth divider 24 further divides the rectangular wave signal outputted from the third divider 23 by a division factor of 2. That is, the first to fourth dividers respectively divide the rectangular wave signal outputted from the comparator 12 by different dividing ratios (i.e., by a factor of 2, 4, 8, or 16).

The multiplexer 26 outputs, based on a control signal inputted from the control signal generating circuit 25, one of many signals (i.e., by selecting either one of the signal directly input from the divider circuit 13 to the multiplexer 26 or the output signals from the first to fourth dividers 21-24).

The control signal generating circuit 25 generates the control signal according to a cycle measured by the cycle-measurement circuit 15. The control signal instructs the multiplexer 26 to output a divided signal with a dividing ratio in reverse proportion to the measured cycle that is measured by the cycle-measurement circuit 15, (i.e., by a smaller dividing ratio when the measured cycle becomes longer and by a larger dividing ratio when the measured cycle becomes shorter). The "small" dividing ratio includes a dividing ratio of 1.

With such control signal, the output signal from the multiplexer 26 (i.e., the cycle of the signal output from the multiplexer 26 via the one-shot circuit 17) is controlled to have a suitably-adapted cycle time that is adapted to a control cycle time of an Electronic Control Unit (ECU) 30 that receives such an output signal.

The signal outputted from the multiplexer 26 is inputted to the one-shot circuit 17. The one-shot circuit 17 outputs a pulse signal that is triggered by a falling edge of the rectangular wave signal outputted from the variable divider 16.

Further, the control signal that indicates a dividing ratio of the signal selected by the multiplexer 26 is inputted to the one-shot circuit 17 from the control signal generating circuit 25. The one-shot circuit 17 changes a LO time of the pulse signal outputted from the one-shot circuit 17 based on the control signal. Such LO time is set with reference to a clock signal that is generated by the oscillator circuit 14.

Figures 2, 3:
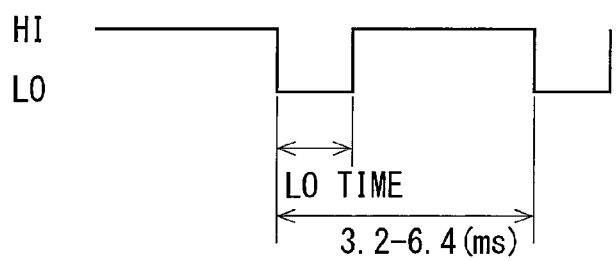
FIG. 2 is a wave form chart of an output signal of the rotation number detector in the first embodiment of the present disclosure.
FIG. 3 is a table of a relationship between a LO time of the output signal of the rotation number detector and a dividing ratio selected by a multiplexer.

FIG. 2 shows a signal outputted from the one-shot circuit 17. According to the present embodiment, the cycle of the signal outputted from the one-shot circuit 17 is set, for example, to 3.2 ms-6.4 ms. The cycle is arbitrarily set for the adaptation to a control cycle time of a control of ECU 30 (e.g., 3 ms-8 ms).

FIG. 3 shows a relationship between the dividing ratio of the signal selected by the multiplexer 26 and the LO time of the signal outputted from the one-shot circuit 17. The one-shot circuit 17 changes the LO time of the signal outputted from the on-shot circuit 17 according to the dividing ratio of the signal selected by the multiplexer 26. Thereby, the one-shot circuit 17 is capable of converting the output signal of the variable divider 16 in a rectangular wave form to a converted pulse signal having the same cycle with the rectangular wave signal and having a wave form from which the dividing ratio used in the division of the variable divider 16 is discernible.

Next, the processing of the signal by the rotation number detector 1 is described.

Figure 4:
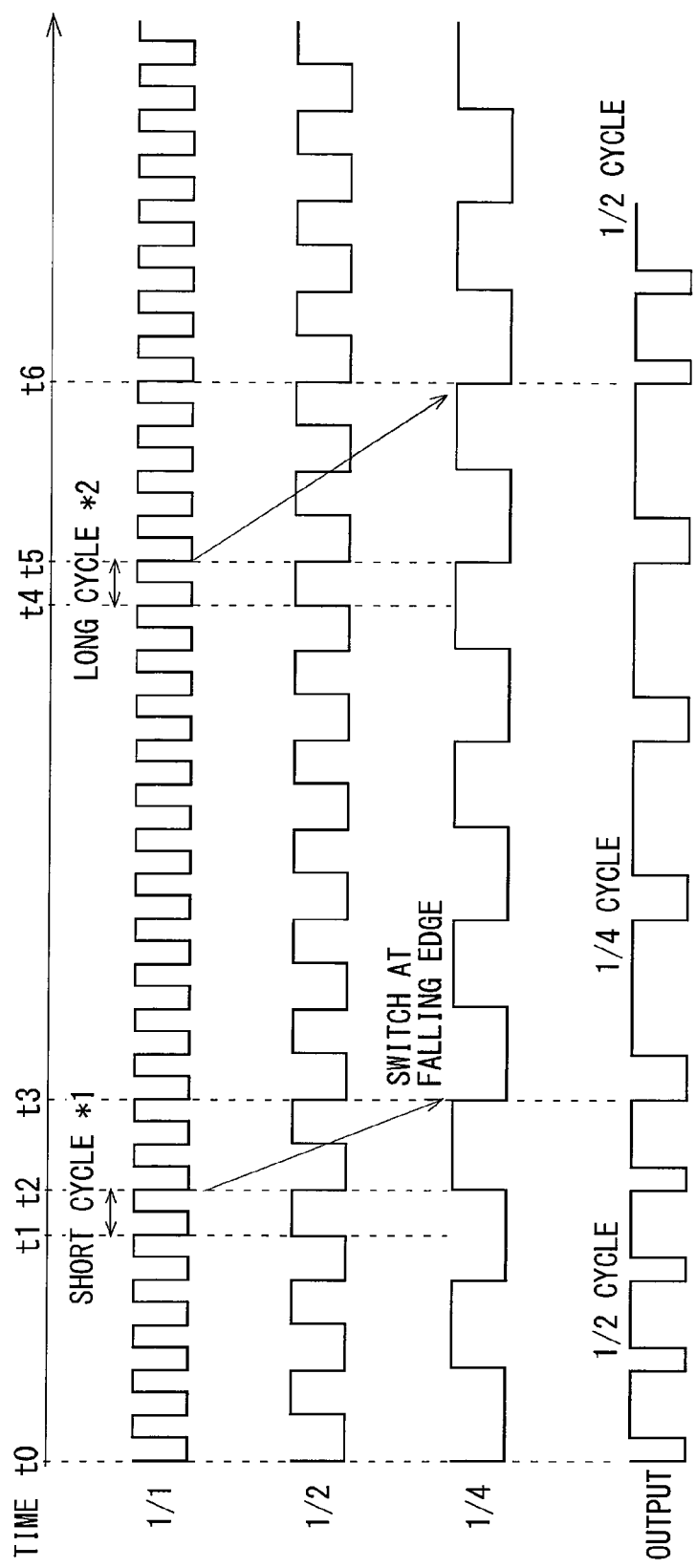
FIG. 4 is a time chart of a signal processing of the rotation number detector.

FIG. 4 shows, in order from an upper part toward a lower part, a time axis, a signal that is directly input to the multiplexer 26 from the divider circuit 13 (i.e., a dividing ratio 1: cycle division by a factor of 1), a signal that is divided by the first divider 21 (i.e., a dividing ratio 1/2: cycle division by a factor of 2), and a signal that is divided by the second divider 22 (i.e., a dividing ratio 1/4: cycle division by a factor of 4) are charted. The bottom row shows an output signal that is output from the one-shot circuit 17. The top row signal with the dividing ratio 1 is inputted to the cycle-measurement circuit 15 from the divider circuit 13.

In FIG. 4, in a period between time t0 and time t1, the multiplexer 26 outputs the signal of the dividing ratio 1/2 according to the control signal of the control signal generating circuit 25. Therefore, the one-shot circuit 17 also outputs a pulse signal which has (i) the same cycle as the signal of the dividing factor 2 and (ii) a dividing ratio 1/2 discernible LO time (e.g., 0.2 ms).

Then, in a period between time t1 and time t2, the control signal generating circuit 25 determines that the measured cycle measured by the cycle-measurement circuit 15 becomes shorter (see FIG. 4 at *1), and generates a control signal for outputting a dividing ratio 1/4 signal from the multiplexer 26. Then, at time t3, the multiplexer 26 switches an output of a dividing ratio 1/2 signal to an output of a dividing ratio 1/4 signal at the falling edge of the dividing ratio 1/2 signal. After time t3, the one-shot circuit 17, beside the multiplexer 26, outputs a pulse signal which has the same cycle as the dividing ratio 1/4 signal and has a LO time (e.g., 0.4 ms) from which it is discernible that the pulse signal is generated in the division of cycle with a division factor of 4.

Next, in a period between time t4 and time t5, the control signal generating circuit 25 determines that the measured cycle measured by the cycle-measurement circuit 15 becomes longer (see FIG. 4 at *2), and generates a control signal for outputting a dividing ratio 1/2 signal from the multiplexer 26. Then, at time t6, the multiplexer 26 switches an output of the dividing ratio 1/4 signal to an output of the dividing ratio 1/2 signal at the falling edge of the dividing ratio 1/4 signal. After time t6, the one-shot circuit 17, beside the multiplexer 26, outputs a pulse signal which has the same cycle as the dividing ratio 1/2 signal and has a LO time (e.g., 0.2 ms) from which it is discernible that the pulse signal is generated in the division of cycle with a division factor of 2.

The table of FIG. 5 shows, from the left to the right, the number of rotations of the detection object, the cycle measured by the cycle-measurement circuit 15, a divided signal by a cycle division factor of 16, a divided signal by a cycle division factor of 8, a divided cycle by a cycle division factor of 4, a divided cycle by a cycle division factor of 2, and a divided cycle by a cycle division factor of 1. The divided cycle by a cycle division factor of 1 means that the signal is directly inputted to the multiplexer 26 from the divider circuit 13.

In FIG. 5, cycles surrounded in thick line cells are target cycles of the signal that is output from the multiplexer 26 (i.e., 3.2 ms-6.4 ms). That is, the cycles enclosed in the thick line are the cycles of the signal outputted to ECU 30 from the rotation number detector 1 via the one-shot circuit 17.

According to the table of FIG. 5, in the present embodiment, when the number of rotations of the detection object is 300,000 rpm, the cycle measured by the cycle-measurement circuit 15 is 0.2 ms. In such case, by using the divided signal with a dividing ratio 1/16, the cycle of the output signal outputted from the rotation number detector 1 is set to 3.2 ms.

Further, when the number of rotations of the detection object is 9,375 rpm, for example, the cycle measured by the cycle-measurement circuit 15 is 6.4 ms. In such case, by using the signal of a dividing ratio 1, the cycle of the output signal outputted from the rotation number detector 1 is set to 6.4 ms.

Therefore, when the control cycle time of a control of ECU 30 is in a range of 3 ms-7 ms, the rotation number detector 1 is enabled to transmit the signal to ECU 30 within such a control cycle time.

The rotation number detector 1 in the first embodiment achieves the following effects.

According to the first embodiment, the variable divider 16 variably divides the cycle of a signal that is measured by the cycle measurement circuit 15 and outputs the signal with the divided cycle, and a dividing ratio of the divided cycle by the variable divider is 1) decreased in reverse proportion to a length of the measured cycle that is measured by the cycle measurement circuit 15 or 2) equated to 1 for not dividing the measured cycle when the length of the measured cycle becomes longer, or 3) is increased in reverse proportion of the length of the measured cycle when the length of the measured cycle becomes shorter. Further, the one shot circuit 17 converts the output signal of the variable divider 16 to a conversion signal having (i) a dividing ratio discernible wave form indicative of the dividing ratio used in the division by the variable divider 16 and (ii) the same cycle as the output signal of the variable divider 16.

In such manner, regardless of the length of the cycle of the output signal of the sensor 11, the length of the cycle of the output signal from the one shot circuit 17 is controlled to be within a preset time length. Therefore, the rotation number detector 1 can control the cycle of the output signal to be within a control cycle time of the recipient (i.e., the electronic control unit 30) receiving the output signal of the rotation number detector 1. Thus, even when the high-low difference of the number of rotations of the detection object is large, the rotation number detector 1 can send out the signal within the control cycle time of the electronic control unit 30 without increasing the load of the electronic control unit 30, thereby enabling an update of the data of the number of rotation in the electronic control unit within the control cycle time.

Further, the dividing ratio discernible wave form of the output signal from the rotation number detector 1 enables determination of the dividing ratio the variable divider 16 used to divide the cycle of the signal. Therefore, the recipient (i.e., ECU 30), can discern the dividing ratio used by the variable divider 16 based on the wave form of the signal. Thus, the ECU 30 can detect the number of rotations of the detection object based on (i) the cycle of the output signal from the rotation number detector 1 and (ii) the dividing ratio discerned from the wave form of the output signal from the rotation number detector 1.

(2) According to the first embodiment, the variable divider 16 includes a plurality of dividers 21-24, the control signal generating circuit 25, and the multiplexer 26.

The plurality of dividers 21-24 perform the division of the rectangular wave signal outputted from the comparator 12 by using the different dividing ratios, and output the cycle-divided signal to the multiplexer 26. The multiplexer 26 selects the rectangular wave signal having an instructed dividing ratio instructed by the control signal that is generated by the control signal generating circuit 25 and outputs the selected rectangular wave signal. The instructed dividing ratio of the output rectangular wave signal is decreased to be "small" in reverse proportion to the length of the measured cycle that is measured by the cycle measurement circuit 15 when the length of the measured cycle becomes longer, or the instructed dividing ratio is increased to be "large" in reverse proportion of the length of the measured cycle when the length of the measured cycle becomes shorter. The "small" dividing ratio may include a dividing ratio of one. Thereby, the variable divider 16 can control the cycle of the rectangular wave signal that is outputted to the one-shot circuit 17 from the multiplexer 26 to be within a preset time length, regardless of the length of the cycle of the output rectangular wave signal from the comparator 12.

(3) According to the first embodiment, the one-shot circuit 17 changes the LO time of the output signal according to the dividing ratio used in the division by the variable divider 16.

Thereby, the rotation number detector 1 can set the LO time of the signal outputted from the one-shot circuit 17 based on the clock signal generated by the oscillator circuit 14.

(4) According to the first embodiment, the divider circuit 13 divides the rectangular wave signal outputted from the comparator 12 by the preset dividing ratio. The cycle-measurement circuit 15 measures the cycle of the rectangular wave outputted from the divider circuit 13 by counting the clock signal outputted from the oscillator circuit 14 between one rising edge and the next rising edge, or between one falling edge and the next falling edge.

In such manner, the cycle-measurement circuit 15 is enabled to measure the divided cycle of the rectangular wave signal that is divided by the divider circuit 13, even when the cycle of the rectangular wave signal outputted from the comparator 12 is short. The accuracy of the cycle measurement is thus improved.

(Second Embodiment)

The rotation number detector 1 in the second embodiment of the present disclosure is described.

According to the second embodiment, the one-shot circuit 17 changes a duty ratio of the output signal based on the control signal inputted from the control signal generating circuit 25.

FIG. 6 shows a relationship between the duty ratio of the output signal of the one-shot circuit 17 and the dividing ratio of the signal selected by the multiplexer 26. The one-shot circuit 17 changes the duty ratio of the signal outputted from the one-shot circuit 17 according to the dividing ratio of the signal selected by the multiplexer 26.

According to the second embodiment, a degree of discernibility of the dividing ratio used in the output signal of the one-shot circuit 17 is improved, without being influenced by an error of the clock signal generated by the oscillator circuit 14.

(Third Embodiment)

The third embodiment of the present disclosure is shown in FIGS. 7-15.

The rotation number detector 1 of the third embodiment is applied, for example, to a serial communication (e.g. Single Edge Nibble Transmission (SENT) communication).

Figure 7:
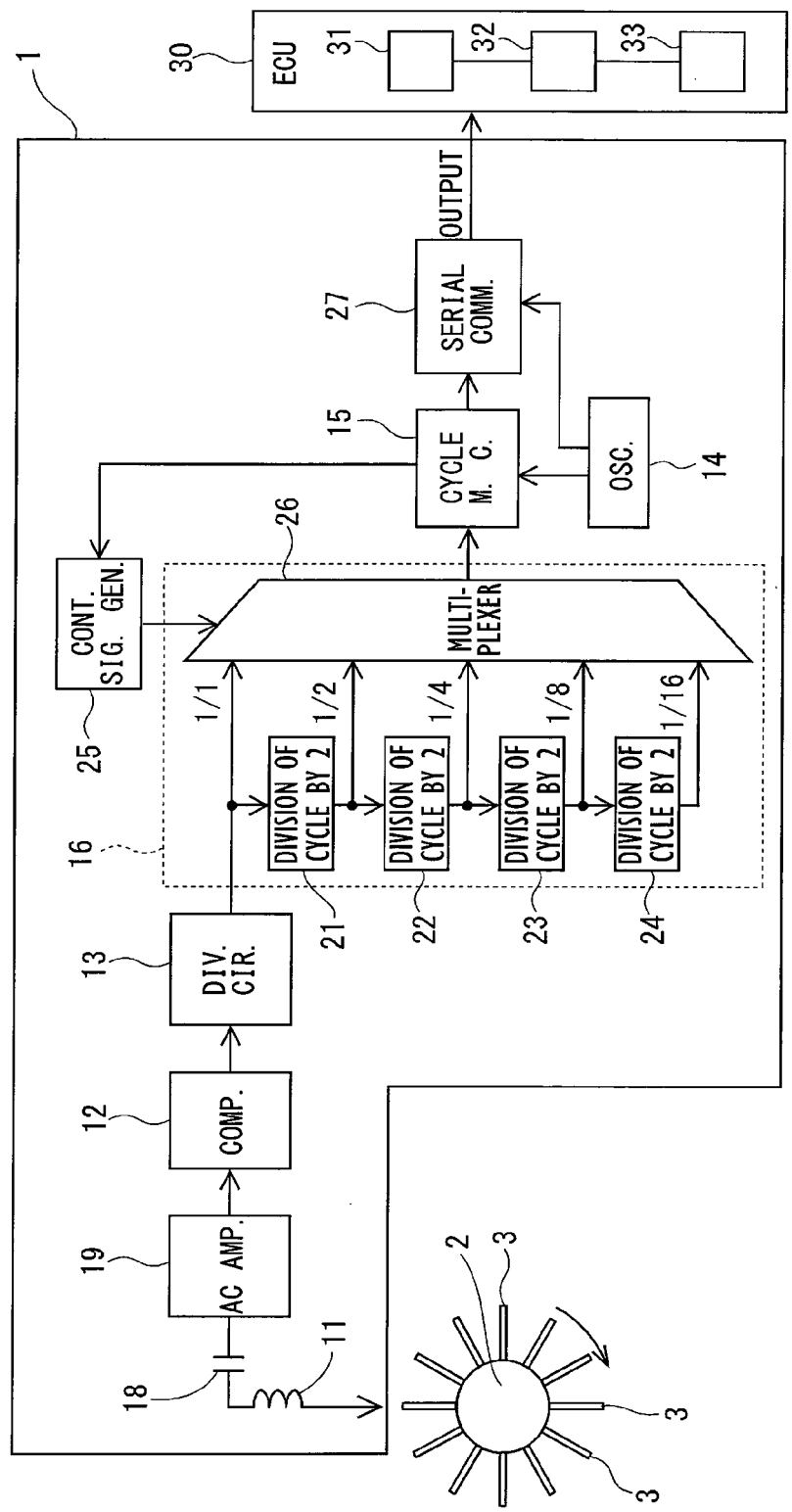
FIG. 7 is a schematic diagram of the rotation number detector in a third embodiment of present disclosure.

As shown in FIG. 7, in the third embodiment, the cycle-measurement circuit 15 measures the cycle of the signal outputted from the multiplexer 26.

The cycle measurement by the cycle-measurement circuit 15 is performed by counting the clock signal outputted at a predetermined interval from the oscillator circuit 14 for a period between one falling edge and the next falling edge of the output rectangular wave signal from the multiplexer 26, or for a period between one rising edge and the next rising edge of the signal from the multiplexer 26.

The cycle-measurement circuit 15 computes a product of a "cycle count value" and a "number according to the dividing ratio of the signal outputted from the multiplexer 26," and stores the data of the computation result in a memory of a serial communication circuit 27. The "number according to the dividing ratio of the signal outputted from the multiplexer 26" may be, for example, a "reciprocal of the dividing ratio of the signal outputted from the multiplexer 26," or an "N time multiplication of a reciprocal of the dividing ratio of the signal outputted from the multiplexer 26," for example.

The control signal generating circuit 25 generates a control signal according to the cycle measured by the cycle-measurement circuit 15. The control signal instructs the multiplexer 26 to output a divided signal with a dividing ratio that is in reverse proportion to the measured cycle that is measured by the cycle-measurement circuit 15 (i.e., the divided signal divided by a smaller dividing ratio when the measured cycle becomes longer and by a larger dividing ratio when the measured cycle becomes shorter). The output signal of the multiplexer 26 is input to the cycle-measurement circuit 15 mentioned above.

The serial communication circuit 27 reads the data regarding the cycle stored in the memory in a regular communication period having a predetermined interval, and outputs the data to ECU 30.

The serial communication circuit 27 of the present embodiment corresponds to a "communication circuit."

Figure 8:
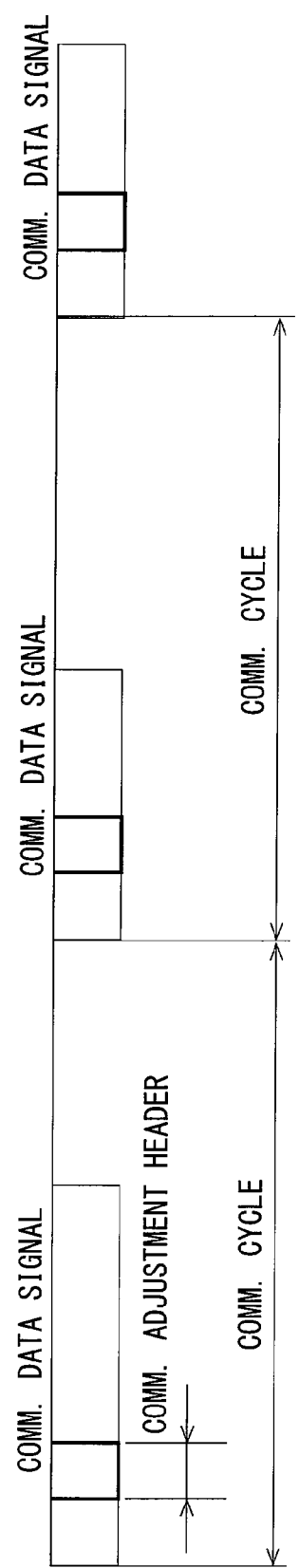
FIG. 8 is a time chart of the output signal of the rotation number detector.

As shown in FIG. 8, a communication data signal outputted to ECU 30 from the serial communication circuit 27 is a combination of a communication adjustment header and data of a communication cycle. The time length of the communication adjustment header is set based on the clock signal generated by the oscillator circuit 14.

As shown in FIG. 7, ECU 30 receives the output signal of the serial communication circuit 27, and detects the number of rotations of the detection object. ECU 30 has a header time measurement section 31, a header time comparator 32, and a cycle data corrector 33.

The header time measurement section 31 detects the time length of the communication adjustment header. Now, if the clock signal of the oscillator circuit 14 in the rotation number detector 1 has an error, the time length of the communication adjustment header also has an error.

Next, the header time comparator 32 compares the time length of the communication adjustment header detected by the header time measurement section 31 with the time length of an authentic communication adjustment header memorized in ECU 30. Therefore, if the clock signal of the rotation number detector 1 has an error, ECU 30 can detect the time length of the error based on such comparison.

Then, the cycle data corrector 33 corrects cycle data based on a time difference between the time length of the communication adjustment header detected by the header time measurement section 31 and the time length of the authentic communication adjustment header.

That is, when the time length of the communication adjustment header detected by the header time measurement section 31 is shorter than the time length of the authentic communication adjustment header memorized in ECU 30, ECU 30 determines that the error of the clock signal in the rotation number detector 1 is on a clock advancing side, thereby correcting the cycle data to have a shorter cycle.

On the other hand, when the time length of the communication adjustment header detected by the header time measurement section 31 is longer than the time length of the authentic communication adjustment header memorized in ECU 30, ECU 30 determines that the error of the clock in the rotation number detector 1 is on a clock delaying side, thereby correcting the cycle data to have a longer cycle.

Thereby, even when the clock signal of the oscillator circuit 14 in the rotation number detector 1 has an error, ECU 30 is enabled to correct the error of the cycle that is caused by the error in the clock signal, and is enabled to detect an accurate number of rotations.

Figure 9:
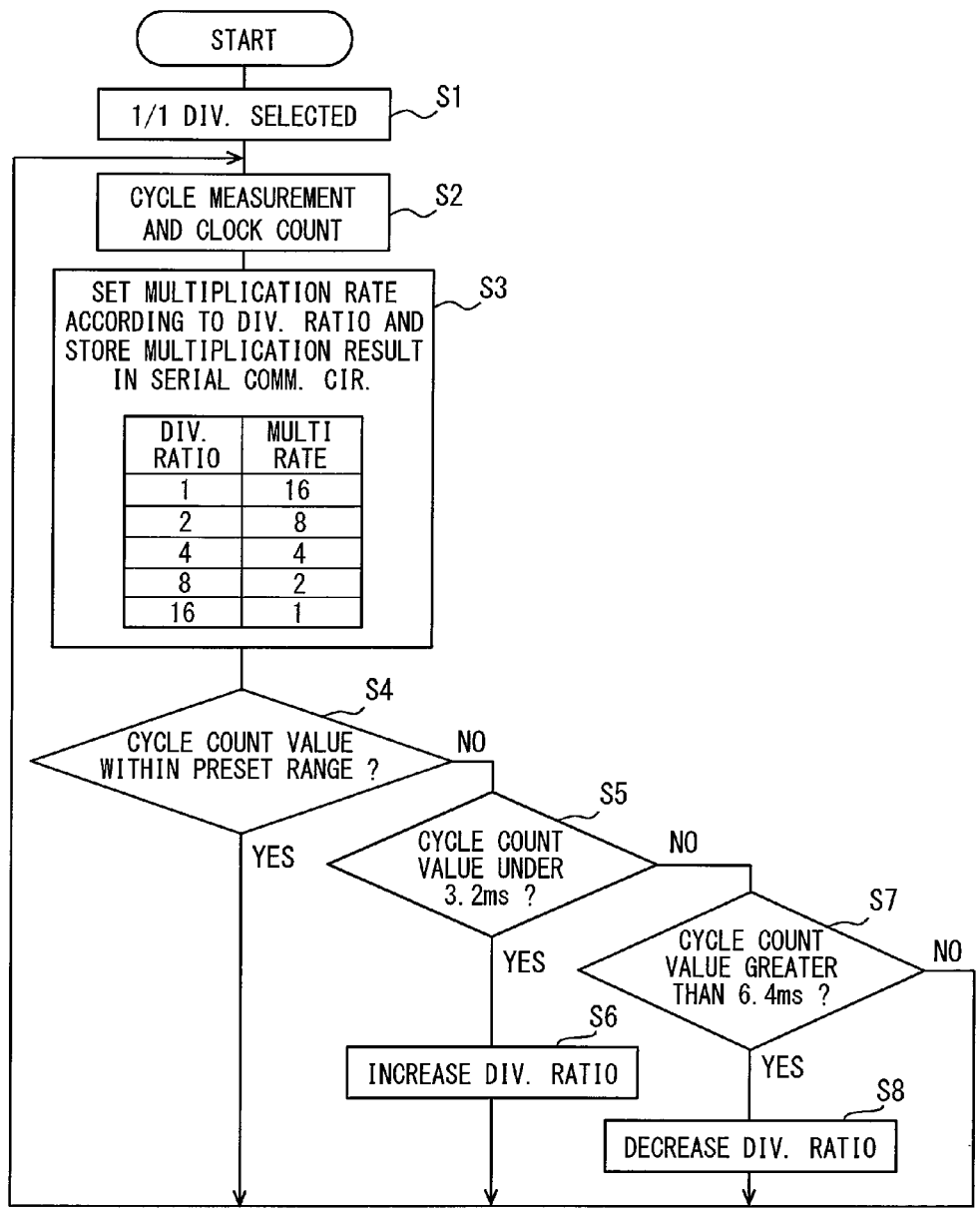
FIG. 9 is a flowchart of the signal processing of the rotation number detector.
Figure 10:
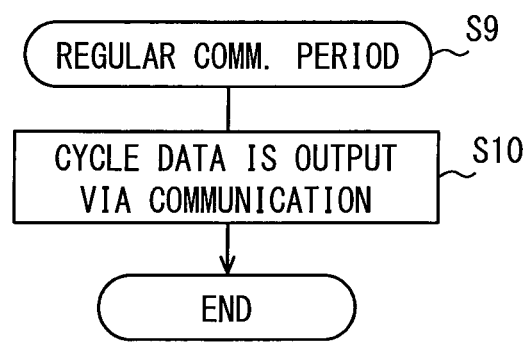
FIG. 10 is a flowchart of the signal processing of the rotation number detector.

Next, the signal processing by the rotation number detector 1 of the third embodiment is described with reference to flowcharts in FIGS. 9 and 10. In FIGS. 9 and 10, the "step" is represented by "S."

The processing is started by switching ON an ignition switch of a vehicle.

At Step 1, the control signal generating circuit 25 generates a control signal for the multiplexer 26 to select the signal with cycle division by a factor of 1, and outputs the divided signal to the multiplexer 26. Thereby, the multiplexer 26 outputs, to the cycle-measurement circuit 15, a signal that is directly input to the multiplexer 26 from the divider circuit 13.

At Step 2, the cycle-measurement circuit 15 counts the cycle of the rectangular wave signal that is outputted from the multiplexer 26 based on the clock signal outputted from the oscillator circuit 14.

At Step 3, the cycle-measurement circuit 15 computes a product of the value (i.e., the "cycle count value") counted at Step 2 and a "multiplication rate" specified on a map stored in the memory, and stores a result of the computation in the memory in the serial communication circuit 27. The "multiplication rate" specified on the map is a number that is a 16 times multiplication value of a reciprocal of the dividing ratio of the signal outputted from the multiplexer 26.

At Step 4, the control signal generating circuit 25 determines whether the cycle count value counted by the cycle-measurement circuit 15 at Step 2 is within a preset range. The preset range may be set as a time length that is adaptable to the regular communication period during which the serial communication circuit 27 outputs the data to ECU 30, or a time length of the control cycle time of a control of ECU 30. According to the present embodiment, the preset range is set as a range between a cycle count value representing a 3.2 ms cycle and a cycle count value representing a 6.4 ms cycle.

The control signal generating circuit 25 advances the process to Step 2, without changing the dividing ratio which is selected by the multiplexer 26, when the cycle count value is in the preset range (Step 4:YES). On the other hand, when the control signal generating circuit 25 advances the process to Step 5 when the cycle count value is not within the preset range.

At Step 5, when the cycle count value is smaller than a count value representing a 3.2 ms cycle (Step 5:YES), the control signal generating circuit 25 outputs, to the multiplexer 26, a one-step larger control signal which instructs the multiplexer 26 to select a one-step larger dividing ratio (Step 6), and advances the process to Step 2. In such case, even when the determination at Step 5 is YES, if a currently-selected dividing ratio selected by the multiplexer 26 is the maximum value (i.e., the dividing ratio 1/16 in the present embodiment) among the plurality of dividing ratios of dividers 21-24, the control signal generating circuit 25 advances the process to Step 2, without changing the dividing ratio currently selected by the multiplexer 26.

On the other hand, when the cycle count value is equal to or greater than the count value representing a 3.2 ms cycle (Step 5:NO), the control signal generating circuit 25 advances the process to Step 7.

At Step 7, when the cycle count value is greater than a count value representing a 6.4 ms cycle (Step 7:YES), the control signal generating circuit 25 outputs, to the multiplexer 26, a one-step smaller control signal which instructs the multiplexer 26 to select a one-step smaller dividing ratio (Step 8), and advances the process to Step 2. In such case, even when the determination at Step 7 is YES, if a currently-selected dividing ratio selected by the multiplexer 26 is the minimum value (i.e., the dividing ratio 1 in the present embodiment), the control signal generating circuit 25 advances the process to Step 2, without changing the dividing ratio that is currently selected by the multiplexer 26.

Then, the rotation number detector 1 repeats an execution of the process between Step 2 to step 8 as mentioned above.

FIG. 10 shows the process that is performed by the serial communication circuit 27.

At Step 9, a signal that notifies that the regular communication period at the predetermined interval has arrived is inputted to the serial communication circuit 27.

Then, at Step 10, when the signal regarding the regular communication period is inputted, the serial communication circuit 27 reads the data regarding the cycle stored in the memory at above-mentioned Step 3, and outputs the data to ECU 30.

The signal processing by the rotation number detector 1 in the third embodiment is described in further details with reference to time charts is FIGS. 11 to 14.

Figure 11:
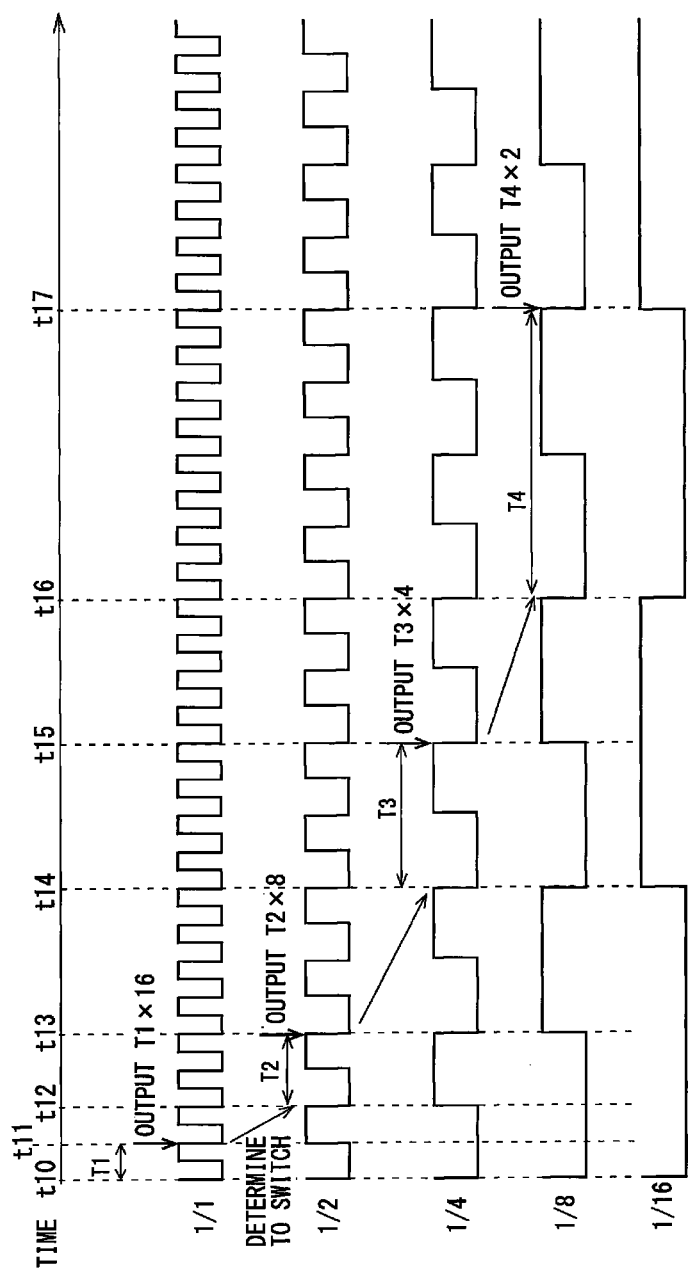
FIG. 11 is a time chart of the signal processing of the rotation number detector.

FIG. 11 illustrates a situation of data storage to the serial communication circuit 27 from the cycle-measurement circuit 15, when the dividing ratio of the output signal outputted to the cycle-measurement circuit 15 from the multiplexer 26 becomes large as time lapses.

In FIG. 11, in order from an upper part toward a lower part, a time axis, a signal that is directly input to the multiplexer 26 from the divider circuit 13 (i.e., a dividing ratio 1: cycle division by a factor of 1), a signal that is divided by the first divider 21 (i.e., a dividing ratio 1/2: cycle division by a factor of 2), and a signal that is divided by the second divider 22 (i.e., a dividing ratio 1/4 : cycle division by a factor of 4), a signal that is divided by the third divider 23 (i.e., a dividing ratio 1/8: cycle division by a factor of 8), and a signal that is divided by the fourth divider 24 (i.e., a dividing ratio 1/16: cycle division by a factor of 16) are charted.

When the signal with cycle division by a factor of 1 is inputted to the to cycle-measurement circuit 15 from the multiplexer 26 in a period between time t10 and time t11, the cycle-measurement circuit 15 computes a product of (i) a cycle count value T1, which is a count of the cycle with a cycle division factor of 1 and (ii) a multiplication rate of 16 for this signal, and stores a result (T1*16) in the serial communication circuit 27.

At time t11, the output signal outputted to the cycle-measurement circuit 15 from the multiplexer 26 is switched from a signal with a cycle division factor of 1 to a signal with cycle division factor of 2, and a signal with a cycle division factor of 2 is inputted to the cycle-measurement circuit 15.

Then, the cycle-measurement circuit 15 computes a product of (i) a cycle count value T2, which is a count of the cycle with a cycle division factor of 2 and (ii) a multiplication rate of 8 for this signal, and stores a result (T2*8) in the serial communication circuit 27.

At time t13, the signal outputted to the cycle-measurement circuit 15 from the multiplexer 26 is switched from a signal with a cycle division factor of 2 to a signal with a cycle division factor of 4, and the signal with a cycle division factor of 4 is inputted to the cycle-measurement circuit 15. Then, the cycle-measurement circuit 15 computes a product of (i) a cycle count value T3, which is a count of the cycle with a cycle division factor of 4 and a multiplication rate 4 for this signal, and stores a result (T3*4) in the serial communication circuit 27.

At time t15, the signal outputted to the cycle-measurement circuit 15 from the multiplexer 26 is switched from a signal with a cycle division factor of 4 to a signal with a cycle division factor of 8, and the signal with a cycle division factor of 8 is inputted to the cycle-measurement circuit 15. Then, the cycle-measurement circuit 15 computes a product of (i) a cycle count value T4, which is a count of the cycle with a cycle division factor of 8 and a multiplication rate 2 for this signal, and stores a result (T4*2) in the serial communication circuit 27.

In such manner, the data regarding the cycle is stored in the serial communication circuit 27.

Figure 12:
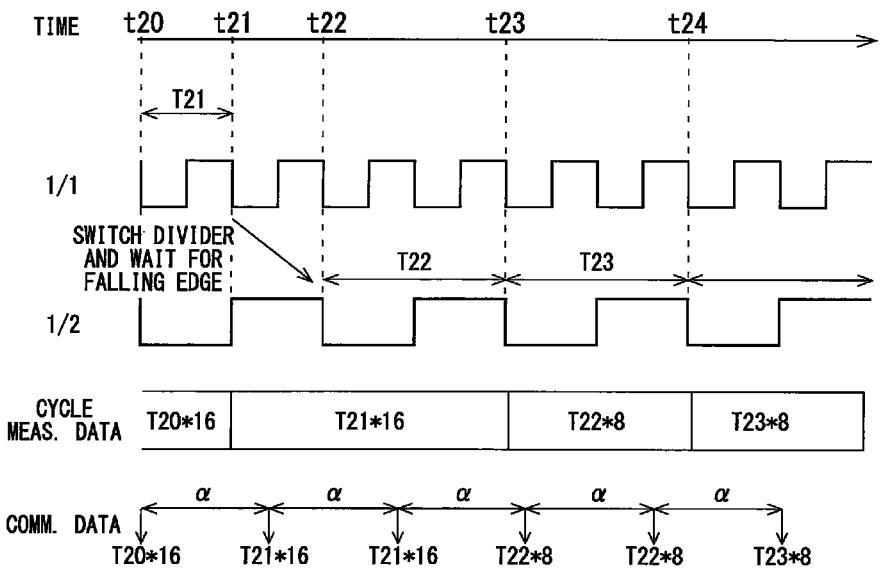
FIG. 12 is a time chart of the signal processing of the rotation number detector.

FIG. 12 illustrates a signal processing when the dividing ratio of the signal outputted to the cycle-measurement circuit 15 from the multiplexer 26 is increased.

FIG. 12 shows, in order from an upper part toward a lower part, a time axis, a signal that is directly input to the multiplexer 26 from the divider circuit 13 (i.e., a dividing ratio 1: cycle division by a factor of 1), a signal that is divided by the first divider 21 (i.e., a dividing ratio 1/2: cycle division by a factor of 2), data that is stored in the memory of the serial communication circuit 27, and an output signal that is outputted from the serial communication circuit 27.

When a signal with a cycle division factor of 1 is inputted to the cycle-measurement circuit 15 from the multiplexer 26 in a period between time t20 and time t21, the cycle-measurement circuit 15 stores in the serial communication circuit 27 a result of multiplication (T21*16) (i.e., a product of a cycle count value T21 and a multiplication rate of 16), at time t21.

At time t21, the signal inputted to the cycle-measurement circuit 15 from the multiplexer 26 switches from a signal with a cycle division factor of 1 to a signal with a cycle division factor of 2, the cycle-measurement circuit 15 waits for a falling edge of the signal with a cycle division factor of 2, and counts cycles in a period between time t22 and time t23. At time t23, the cycle-measurement circuit 15 stores in the serial communication circuit 27 a result of multiplication (T22*8)(i.e., a product of a cycle count value T22 and a multiplication rate of 8).

Then, the cycle-measurement circuit 15 counts cycles of the signal with a cycle division factor of 2 in a period between time t23 and time t24 and, at time t24, the cycle-measurement circuit 15 stores in the serial communication circuit 27 a result of multiplication (T23*8), (i.e., a product of a cycle count value T23 and a multiplication rate of 8).

The serial communication circuit 27 receives an input of a signal that notifies the regular communication period at a predetermined interval α. When receiving the signal notifying the regular communication period, the serial communication circuit 27 reads and outputs the data stored in the memory.

Figure 13:
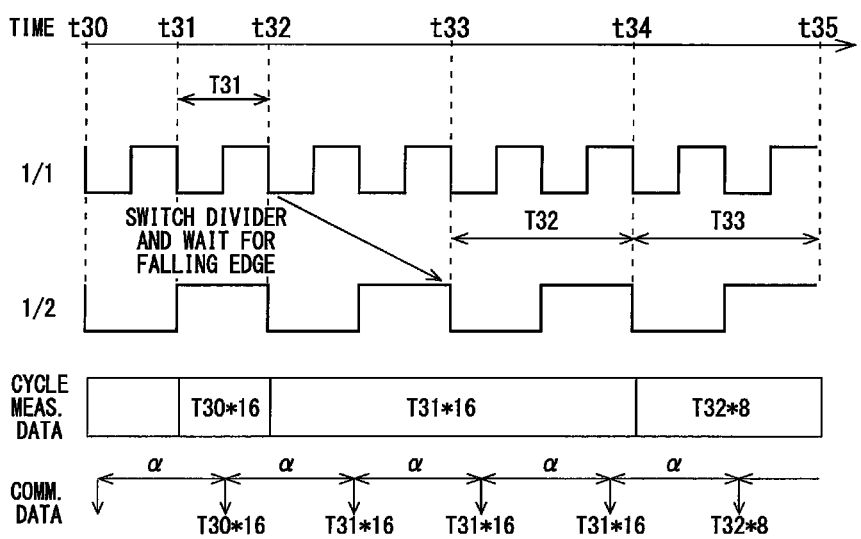
FIG. 13 is a time chart of the signal processing of the rotation number detector.

FIG. 13 also illustrates a situation of increasing the dividing ratio of the signal outputted to the cycle-measurement circuit 15 from the multiplexer 26.

When a signal with a cycle division factor of 1 is inputted to the cycle-measurement circuit 15 from the multiplexer 26 in a period between time t31 and time t32, the cycle-measurement circuit 15 stores in the serial communication circuit 27 a result of multiplication (T31*16) (i.e., a product of a cycle count value T31 and a multiplication rate of 16), at time t31.

At time t32, the signal inputted to the cycle-measurement circuit 15 from the multiplexer 26 switches from a signal with a cycle division factor of 1 to a signal with a cycle division factor of 2, the cycle-measurement circuit 15 waits for a falling edge of the signal with a cycle division factor of 2, and counts cycles in a period between time t32 and time t33. At time t33, the cycle-measurement circuit 15 stores in the serial communication circuit 27 a result of multiplication (T32*8) (i.e., a product of a cycle count value T32 and a multiplication rate of 8).

The serial communication circuit 27 reads and outputs the data stored in the memory, when a signal notifying the regular communication period is inputted to the memory.

Figures 14, 15:
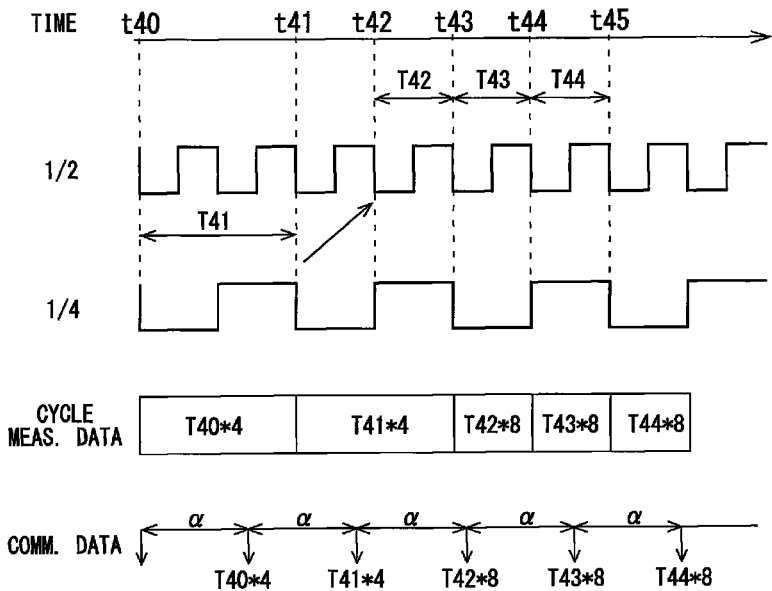
FIG. 14 is a time chart of the signal processing of the rotation number detector.
FIG. 15 is a table of a relationship among a number of rotations of a detection object, a measurement cycle of a sensor signal, a dividing ratio, and a cycle of the output signal.

FIG. 14 illustrates a signal processing when decreasing the dividing ratio of the signal outputted to the cycle-measurement circuit 15 from the multiplexer 26.

FIG. 14 shows, in order from an upper part toward a lower part, a time axis, a signal that is divided by the first divider 21 (i.e., a dividing ratio 1/2: cycle division by a factor of 2), a signal that is divided by the second divider 22 (i.e., a dividing ratio 1/4: cycle division by a factor of 4), data that is stored in the memory of the serial communication circuit 27, and an output signal that is outputted from the serial communication circuit 27.

When a signal with a cycle division factor of 2 is inputted to the cycle-measurement circuit 15 from the multiplexer 26 in a period between time t40 and time t41, the cycle-measurement circuit 15 stores in the serial communication circuit 27 a result of multiplication (T41*4) (i.e., a product of a cycle count value T41 and a multiplication rate of 4), at time t41.

At time t41, the signal inputted to the cycle-measurement circuit 15 from the multiplexer 26 switches from a signal with a cycle division factor of 4 to a signal with a cycle division factor of 2, the cycle-measurement circuit 15 waits for a falling edge of the signal with a cycle division factor of 2, and counts cycles in a period between time t42 and time t43. At time t43, the cycle-measurement circuit 15 stores in the serial communication circuit 27 a result of multiplication (T42*8) (i.e., a product of a cycle count value T42 and a multiplication rate of 8).

Then, the cycle-measurement circuit 15 counts cycles of the signal with a cycle division factor of 2 in a period between time t43 and time t44, and, at time t44, the cycle-measurement circuit 15 stores in the serial communication circuit 27 a result of multiplication (T43*8) (i.e., a product of a cycle count value T43 and a multiplication rate of 8).

The serial communication circuit 27 reads and outputs the data stored in the memory, when the signal notifying the regular communication period is inputted to the memory.

Next, a table of FIG. 15 shows, from the left to the right, the number of rotations of the detection object, the cycle measured by the cycle-measurement circuit 15, a divided signal by a cycle division factor of 16, a divided signal by a cycle division factor of 8, a divided cycle by a cycle division factor of 4, a divided cycle by a cycle division factor of 2, and a divided cycle by a cycle division factor of 1.

In FIG. 15, the cycles in thick line cells are target cycles of the signal outputted from the multiplexer 26.

On the other hand, in FIG. 15, the cycles in one-dot broken line cells are a no-count region in which the cycle-measurement circuit 15 does not count the cycles of the signal. The cycles in the no-count region are set as a two-fold or more of the cycles in the thick line cells. The signals in the no-count region may be outputted temporarily from the multiplexer 26, when the number of rotations of the detection object steeply falls.

The no-count region in the one-dot broken line cells may be set to a different region that is differently set from the above-described no-count region (i.e., a region other than the two-fold or more cycle region). In other words, the no-count region may be set as a region of an N-fold cycle length against a cycle length in the thick line cells, containing a cycle that is longer by N-fold or more than a cycle of an immediately-before signal that is outputted from the multiplexer 26. The N-fold or more longer cycle against a cycle of an immediately-before signal may also be understood that a cycle length of the output signal is longer than a cycle length of an immediately-before output signal by a preset length or more.

When the signal in a region of the one-dot broken line cells is inputted from the multiplexer 26, the cycle-measurement circuit 15 does not count the cycle of the inputted signal, or does not output the cycle count value to the serial communication circuit 27. Therefore, the serial communication circuit 27 maintains the data outputted from the cycle-measurement circuit 15 immediately before such a situation. Thus, the serial communication circuit 27 outputs the data regarding the cycle outputted in an immediately-before communication cycle. While outputting such a data, according to the control signal generated by the control signal generating circuit 25, the multiplexer 26 decreases the dividing ratio of the signal outputted to the cycle-measurement circuit 15, and outputs a signal having a shorter cycle than the signal in a region of the one-dot broken line cells to the cycle-measurement circuit 15.

In such manner, the cycle-measurement circuit 15 is enabled to quickly update the data stored in the serial communication circuit 27 in a short period of time. Therefore, the rotation number detector 1 is enabled to update the data outputted to ECU 30 from the serial communication circuit 27 in a short period of time.

Further, the rotation number detector 1 can use the serial communication circuit 27 that has only a small storage capacity for storing the data regarding the cycle.

The rotation number detector 1 of the third embodiment achieves the following effects.

(1) In the third embodiment, the variable divider 16 divides the cycle of the rectangular wave signal that is output from the comparator 12 with a smaller dividing ratio when the cycle of the output rectangular wave signal becomes longer, or divides the cycle with a cycle division factor of 1 (i.e., without dividing), or divides the cycle of the signal with a larger dividing ratio when the cycle of the output rectangular wave signal becomes shorter.

The cycle-measurement circuit 15 measures the cycle of the signal outputted from the multiplexer 26, and outputs, to the serial communication circuit 27, the data that is a product of (i) the cycle count value detected by the measurement and (ii) the number according to the dividing ratio of the signal outputted from the variable divider 16. The serial communication circuit 27 then reads and outputs the data memorized in the memory.

In such manner, when the cycle of the rectangular wave signal outputted from the comparator 12 is short, the variable divider 16 divides the cycle of the rectangular wave signal by a larger dividing ratio, thereby improving an accuracy of the cycle measurement by the cycle-measurement circuit 15. Thus, the rotation number detector 1 may improve the accuracy of the data outputted from the serial communication circuit 27.

Further, even when the cycle of the rectangular wave signal outputted from the comparator 12 is long, the variable divider 16 divides the cycle of the rectangular wave signal by a smaller dividing ratio, thereby preventing the cycle measurement time by the cycle-measurement circuit 15 from exceeding the cycle of the output signal from the comparator 12. Therefore, the rotation number detector 1 can quickly update the data outputted from the serial communication circuit 27.

(2) In the third embodiment, when the cycle of the signal outputted from the multiplexer 26 becomes longer than the cycle of the immediately-before output signal from the multiplexer 26 by a preset length or more, the cycle-measurement circuit 15 does not measure the cycle of the signal, and the serial communication circuit 27 outputs the data regarding the cycle that is outputted in an immediately-before communication cycle.

For example, in a situation that the number of rotations of the detection object steeply falls, the cycle of the signal outputted from the multiplexer 26 may become drastically longer than the cycle of the immediately-before output signal. In such case, if the cycle-measurement circuit 15 measures the cycle of the signal, update of the data may be delayed (i.e., the updating of the data may take a longer time relative to the length/duration of the communication cycle).

Therefore, in the present embodiment, the rotation number detector 1 is configured to output the immediately-before data from the serial communication circuit 27, and, while outputting such data, the cycle-measurement circuit 15 measures a cycle of the signal that is appropriately divided by the variable divider 16, and the data of such measurement is output from the serial communication circuit 27.

Thus, the rotation number detector 1 can quickly update the data outputted to ECU 30 from the serial communication circuit 27 by quickly changing the dividing ratio in a short period of time.

Further, the rotation number detector 1 can use the serial communication circuit 27 with only a small storage capacity for the storage of the data about the cycle.

(3) In the third embodiment, ECU 30 is provided with the header time measurement section 31, the header time comparator 32, and the cycle data corrector 33.

The header time measurement section 31 detects the header time (i.e., time length of the header) in the communication data signal. The header time comparator 32 compares by the header time detected by the header time measurement section 31 with the authentic header time memorized in the electronic control unit 30. The cycle data corrector 33 corrects the data regarding the cycle of the communication data signal according to the time difference between the header time detected by the header time measurement section 31 and the authentic header time.

In such manner, even when the clock signal of the oscillator circuit 14 in the rotation number detector 1 has an error, ECU 30 can correct the error of the cycle due to the error in the clock signal. Therefore, ECU 30 can detect an accurate number of rotations based on the communication data signal outputted from the rotation number detector 1.

(Fourth Embodiment)

Figure 16:
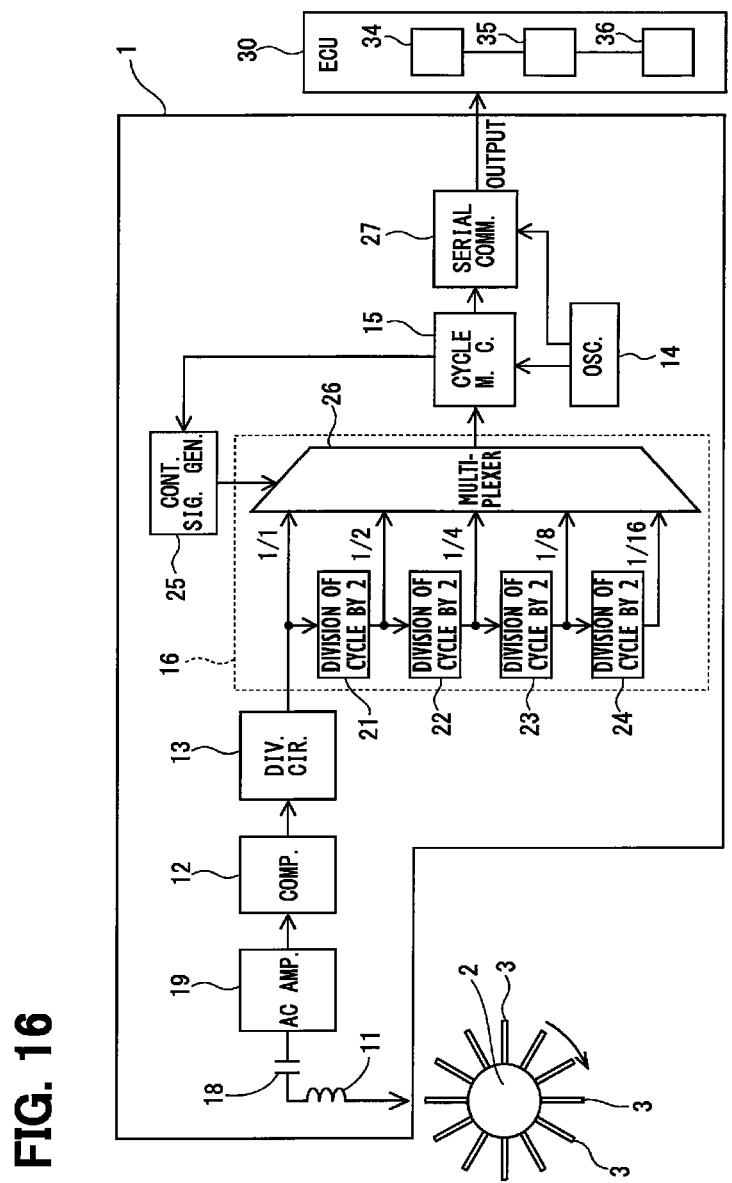
FIG. 16 is a schematic diagram of the rotation number detector in a fourth embodiment of present disclosure.
Figure 17:
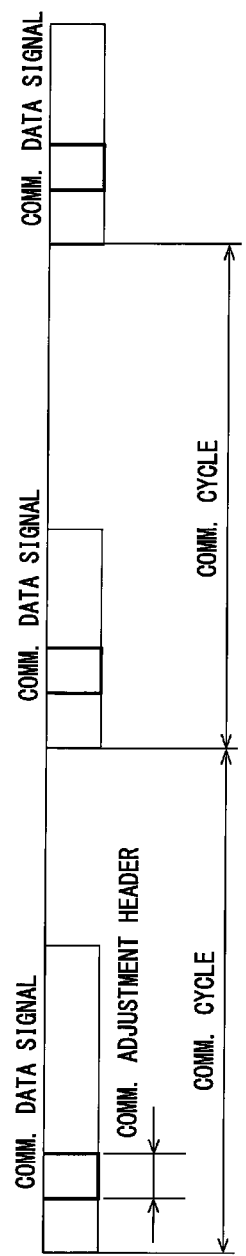
FIG. 17 is a time chart of the output signal of the rotation number detector.

The fourth embodiment of the present disclosure is shown in FIGS. 16 and 17.

In the fourth embodiment, ECU 30 is provided with a communication cycle measurement section 34, a communication cycle comparison section 35, and a cycle data corrector 36, which are different from the third embodiment.

The communication cycle measurement section 34 measures the time length of the communication cycle during which the communication data signal is outputted. Throughout the specification/description, the time length of the communication cycle means a length of time between the same timing of successive communication formats.

In the fourth embodiment, a situation is described by using the term "communication cycle," which indicates a period of time between one output start timing of a communication data, and the next output start timing of the communication data. However, the term "communication cycle" is not necessarily limited to such a period of time, allowing other interpretation such as a period of time between two end timings of the communication adjustment header in the communication data signal, or the like. That is, the communication cycle and the time length of the communication cycle may be variously defined depending on the communication format of various types.

In the fourth embodiment, the rotation number detector 1 has to determine the time length of the communication cycle as a fixed amount of time. The rotation number detector 1 determines the communication cycle based on the clock signal generated by the oscillator circuit 14.

The communication cycle comparison section 35 compares the communication cycle measured by the communication cycle measurement section 34 with an authentic communication cycle memorized in ECU 30.

The cycle data corrector 36 corrects the data regarding the cycle of the communication data signal according to the time difference between the communication cycle detected by the communication cycle measurement section 34 and the authentic communication cycle.

Now, in case that the clock signal of the oscillator circuit 14 in the rotation number detector 1 has an error, the communication cycle also has an error due to the error of the clock signal. Therefore, the cycle data corrector 36 determines that an error of the clock signal is on a clock advancing side when the communication cycle detected by the communication cycle measurement section 34 is shorter than the authentic communication cycle, and corrects the cycle data to define a shorter length of time (i.e., a shorter cycle).

On the other hand, the cycle data corrector 36 determines that an error of the clock signal is on a clock delaying/ retarding side when the communication cycle detected by the communication cycle measurement section 34 is longer than the authentic communication cycle, and corrects the cycle data to define a longer length of time (i.e., a longer cycle).

In the fourth embodiment, ECU 30 corrects the communication cycle using the communication cycle, a time length of which is longer than the time length of the header time used in the third embodiment, thereby improving the measurement accuracy and enabling a high accuracy correction of the cycle data regarding the detected pulse signal.

(Other Embodiments)

The following embodiments may also be adopted in addition to the embodiment mentioned above.

(1) The rotation number detector 1 may also be used, for example, for the detection of the number of rotations of the various rotating bodies (e.g., a crankshaft) other than a turbo charger.

(2) The rotation number detector 1 may also be used to process an output signal of, for example, a sensor 11 in a device other than a coil (e.g., a Hole IC, a magneto-resistance effect element (MRE), and the like).

(3) The rotation number detector 1 may also be configured to directly measure the cycle of the rectangular wave signal by the cycle-measurement circuit 15, without dividing the output signal from the comparator 12 by the divider circuit 13.

(4) The rotation number detector 1 may also change the HI time of the pulse signal outputted from the one-shot circuit 17, in order to discern the dividing ratio of the division performed by the variable divider 16.

(5) The rotation number detector 1 may also have a one-shot circuit 17 that outputs a pulse signal, which is triggered by a rising edge of the rectangular wave signal outputted from the multiplexer 26.

(6) The rotation number detector 1 may also be used in a bi-directional communication such as a Local Interconnect Network (LIN) or the like, beside the SENT communication.

Thus, the present disclosure is not necessarily limited to the above-described embodiment, which is only a few examples thereof, and may take various forms of modifications and combinations, as long as pertaining to a gist of the disclosure.

Although the present disclosure has been described in connection with preferred embodiment thereof with reference to the accompanying drawings, it is to be noted that various changes and modifications will become apparent to those skilled in the art, and such changes, modifications, and summarized schemes are to be understood as being within the scope of the present disclosure as defined by appended claims.

What is claimed is:

1. A rotation number detector configured to detect a number of rotations of a detection object, the detector comprising:
   a sensor configured to detect a movement of a detected portion of a rotating detection object and to output a signal according to the movement of the detected portion of the detection object;
   a comparator configured to compare the output signal of the sensor to a preset threshold and to output a rectangular wave signal;
   an oscillator circuit configured to generate and output a clock signal;
   a cycle measurement circuit in connection with the oscillator circuit and configured to measure a cycle of the rectangular wave signal output from the comparator based on the clock signal;
   a variable divider in connection with the cycle measurement circuit and configured to divide the rectangular wave signal from the comparator by a plurality of dividing ratios into a plurality of divided output signals, and to output one of the plurality of divided output signals based on the cycle measured by the cycle measurement circuit, wherein a dividing ratio is inversely proportional to the measured cycle such that the dividing ratio increases as the measured cycle decreases; and
   a one-shot circuit in connection with the variable divider and configured to convert the one of the plurality of divided output signals output from the variable divider to a conversion signal having (i) a waveform indicative of the dividing ratio used in the division by the variable divider and (ii) a same cycle as the one of the plurality of divided output signals output from the variable divider, and to output the conversion signal to an external electronic control unit.

2. The rotation number detector of claim 1, wherein the variable divider includes:
   a plurality of dividers, each of the plurality of dividers configured to divide the rectangular wave signal from the comparator by a different dividing ratio, and to output a divided output signal;

a multiplexer configured to receive the plurality of divided output signals and to select the one of the plurality of divided output signals to output; and a control signal generator configured to generate a control signal based on the measured cycle and to output the control signal to the multiplexer, wherein the control signal instructs the multiplexer to select and output the one of the plurality of divided output signals.

3. The rotation number detector of claim 1, wherein the one shot circuit is configured to change a HI time or a LO time of the signal based on the dividing ratio of the variable divider.

4. The rotation number detector of claim 1, wherein the one shot circuit is configured to change a duty ratio of the signal based on the dividing ratio of the variable divider.

5. A rotation number detector, the detector comprising:

a sensor configured to detect a movement of a detected portion of a rotating detection object and to output a signal based on the movement of a detected portion of a detection object;

a comparator configured to compare the output signal of the sensor to a preset threshold and to output a rectangular wave signal;

a variable divider configured to divide the rectangular wave signal from the comparator by a plurality of dividing ratios into a plurality of divided output signals, and to output one of the plurality of divided output signals, wherein a dividing ratio is inversely proportional to the measured cycle such that the dividing ratio increases as the measured cycle decreases;

a cycle measurement circuit in connection with the variable divider and configured to measure a cycle of the one divided output signal output by the variable divider and to output a calculation data that is a multiple of a cycle count value and a number that is proportional to the dividing ratio of the one divided output signal output by the variable divider; and a communication circuit configured to store the output calculation data of the cycle measurement circuit, and to read and to output the stored output calculation data at predetermined intervals.

6. The rotation number detector of claim 5, wherein when a cycle length of the one divided output signal output by the variable divider is longer than a cycle length of a preceding output signal of the variable divider by a preset length or more, the cycle measurement circuit is further configured to prevent a measurement of the one divided output signal output by the variable divider, and to output a calculation data for the preceding output signal.

7. An electronic control unit configured to receive a communication data signal output from the communication circuit of the rotation number detector of claim 5, the electronic control unit comprising:

a header time measurement section configured to detect a header time of the communication data signal received from the communication circuit;

a header time comparator configured to compare the header time detected by the header time measurement section with a normal header time stored in the electronic control unit; and a cycle data corrector configured to correct a cycle data of the communication data signal based on a time difference between the header time detected by the header time measurement section and the normal header time.

8. An electronic control unit configured to receive a communication data signal output from the communication circuit of the rotation number detector of claim 5, the electronic control unit comprising:

a communication cycle time measurement section configured to measure a communication cycle time of the communication data signal received from the communication circuit;

a communication cycle time comparator configured to compare the communication cycle time measured by the communication cycle time measurement section with a normal communication cycle time stored in the electronic control unit; and a cycle data corrector configured to correct a cycle data of the communication data signal based on a time difference between the communication cycle time detected by the communication cycle time measurement section and the normal communication cycle time.

* * * * *